3,418,281
THERMALLY STABLE AMINO-SUBSTITUTED
AROMATIC ALDEHYDE RESINS AND PROC-
ESS OF MAKING SAME
Harry A. Smith and William K. Carrington, Midland, Mich., assignors to The Dow Chemical Company, Midland, Mich., a corporation of Delaware
No Drawing. Filed Jan. 27, 1964, Ser. No. 340,544
6 Claims. (Cl. 260—72.5)

This invention relates to the production of new synthetic materials and more particularly to new reaction products of particular utility in the molding and coating arts.

In order to obtain thermally stable organic materials useful for high temperature applications, a highly conjugated aromatic system is found most suitable for these purposes. However, high conjugation generally leads to intractable materials which are difficult to fabricate using conventional methods and apparatus.

The present invention has for one of its objects the provision of novel polymeric substances. Another object is to provide new compounds which are suitable for use as molding and high temperature coating materials. A further object of the invention is to provide materials which are highly conjugated aromatic polymers which can be fabricated by conventional techniques. Other objects will appear hereinafter.

The polymers contemplated within the scope of this invention are formed by heating an amino-substituted aromatic aldehyde having the general formula $$H_2N—X—CHO$$

in which X is a divalent mono-nuclear or a polynuclear aromatic hydrocarbon radical, and mixtures thereof, in the presence of a suitable ionic catalyst such as zinc chloride.

Specfic examples of suitable amino-substituted aromatic aldehydes which can be employed to prepare the polymers of this invention include p-aminobenzaldehyde, 4'-amino-4-biphenylaldehyde, 1-amino-5-naphthaldehyde, 2-amino-6-naphthaldehyde, 1-amino-7-naphthaldehyde, 1-amino-4-anthraldehyde, 2-amino-5-anthraldehyde and 9-amino-10-anthraldehyde.

Suitable ionic catalysts include tertiary amines such as tri-n-butylamine, triethylene diamine, N-methyl morpholine, tetramethylethylenediamine, and "Lewis" acids; i.e., compounds of acid reaction such as $AlCl_3$, $SnCl_4$, $ZnCl_2$, $PCl_3$, boron halides, and the like.

The catalyst is present in the reaction mixture at a concentration range of 0.5 to 15 percent based on the aldehyde monomer, 1 to 10 percent being preferred.

The reaction is preferably carried out in the absence of diluent, for the presence of diluent increases reaction time. Moreover, the absence of solvent enhances the reactivity of the monomers and promotes a continued polymerizing reaction.

The polymers are usually prepared by mixing the amino-aromatic aldehyde and catalyst in a suitable reaction vessel. The reaction mixture is then heated at atmospheric pressure or under vacuum. The reaction can be conducted at elevated temperatures ranging from about 25° to about 250° C., 50° to 150° C. being preferred, for periods of time ranging from 3 to 48 hours or longer. Such reaction times are also dependent, as will be apparent to those skilled in the art, upon the catalyst utilized and the temperature employed for the reaction. Reaction temperatures outside the ranges described above should be avoided. If the temperature is substantially below 25° C., incomplete reaction results and if the temperature is substantially above 250° C., monomer degradation or undesirable side reactions such as oxidation occur.

The polymers of this invention have softening points in the range of 115° to 350° C. and are soluble in a variety of solvents such as acetone, dimethyl formamide, chlorinated aromatic hydrocarbons, and nitrobenzene. They can also be molded at about 400° C. to form tough flexible films. As a result, the polymers described herein have a wide variety of uses. For example, they may be artifically shaped as molded or cast into self-supporting films. Their most valuable application, however, is as a high temperature coating composition, this being especially true for those polymers which are soluble in an organic solvent from which they may be applied. In addition, the polymer when pressed at 400° C. and high ram pressures has very good fluidity and yields molded pieces of good homogeneity and strength.

While the invention is susceptible to considerable variation and modification in the manner of its practical application, particularly as regards the kind and amount of reactants, and the conditions of reaction such as temperature and catalysts employed, the following examples will serve to illustrate how the polymers of the present invention are prepared.

Example 1

To a 250 ml. flask equipped with an air condenser were charged 2.0 grams (0.017 mole) of p-aminobenzaldehyde, and 0.23 grams (0.0017 mole) of zinc chloride. The temperature of the reaction mixture was raised to 50° C. and the mixture heated for 48 hours. The reaction mixture was then cooled, and dried in air. An orange-red resinous material was obtained in 100 percent yields (2.2 grams) which had a softening point of 350° C. The orange-red color of the material is indicative of the highly conjugated structure of the material which was confirmed by infrered spectrophotometric analysis and nuclear magnetic resonance spectroscopy to have the following highly conjugated structure:

wherein $n$ indicates that the defined sequence is repeated a number of times in the molecular structure of the resins.

The material was molded between two aluminum sheets at about 400° C. and 40,000 lbs. ram pressure to produce a clear, tough, flexible, thermally stable film which formed a good adhesive bond to aluminum. The polymer was soluble in acetone, dimethyl formamide, and nitrobenzene.

Example 2

The procedure of Example 1 was repeated with the exception that the reaction mixture was heated at 100° C. An oragne-red resinous material was obtained in 100 percent yield which had a softening range of 115°–350° C. A very good adhesive bond to aluminum was obtained when the resinous material was molded at 400° C. and 40,000 lbs. ram pressure.

Example 3

The procedure of Example 1 was repeated with the exception that the reaction mixture was heated at 150° C. An orange-red material was obtained in 94.6 percent yield which had a softening range of 230°–350° C. A very strong adhesive bond to aluminum was obtained when the polyimine was molded at 400° C. and 40,000 lbs. ram pressure.

In place of the p-aminobenzaldehyde used in the reaction mixture of the above example, there can be substituted any equivalent amount of any of the other mentioned amino substituted aromatic aldehydes as for example 4'-amino-4-biphenylaldehyde, 1-amino-5-naphthaldehyde and 1-amino-4-anthraldehyde to obtain similar, resinous products having high softening points.

What is claimed is:

1. A film-forming polymer resin having softening point in the range from 115° to 350° C. and the conjugated structure

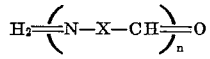

wherein $n$ is a polymeric number and —X— is defined below, obtained by heating an amino-substituted aromatic aldehyde having the general formula

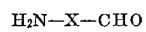

wherein X is an aromatic nucleus selected from the group consisting of benzene, polybenzene, naphthalene and anthracene at a temperature from about 25° C. to about 250° C. in the presence of an ionic catalyst.

2. The resin of claim 1 wherein the amino-substituted aromatic aldehyde is amino benzaldehyde.

3. The resin of claim 1 wherein the ionic catalyst is zinc chloride.

4. A process for producing film forming synthetic polymer resins having high softening points in the range from 115° to 350° C. and the conjugated structure

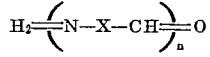

wherein $n$ is a polymeric number and —X— is defined below, which comprises heating at a temperature of from about 25° to about 250° C., for at least 3 hours, and in the presence of an ionic catalyst, an amino-substituted aromatic aldehyde having the general formula

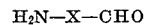

wherein X is an aromatic nucleus selected from the group consisting of benzene, polybenzene, naphthalene and anthracene.

5. The process of claim 4 wherein the amino-substituted aromatic aldehyde is amino benzaldehyde.

6. The process of claim 4 wherein the ionic catalyst is zinc chloride.

References Cited

UNITED STATES PATENTS

| | | | |
|---|---|---|---|
| 640,564 | 1/1900 | Homolka et al. | 260—578 |
| 667,382 | 2/1901 | Ach | 260—578 |
| 676,862 | 6/1901 | Ach | 260—578 |
| 2,302,403 | 11/1942 | Tetley | 260—67 |
| 2,766,287 | 10/1956 | Rottig | 260—578 |
| 3,114,732 | 12/1963 | Von Brachel et al. | 260—52 |

FOREIGN PATENTS 262,600  1/1950  Switzerland.

WILLIAM H. SHORT, *Primary Examiner.*

L. M. PHYNES, *Assistant Examiner.*

U.S. Cl. X.R.

260—67, 32.4, 32.8; 161—215